Jan. 26, 1960  J. W. ANDERSON  2,922,310
COMPOSITE PULLEY STRUCTURE
Filed Feb. 1, 1957

INVENTOR.
BY John W. Anderson
ATTORNEYS

United States Patent Office 2,922,310
Patented Jan. 26, 1960

2,922,310
COMPOSITE PULLEY STRUCTURE
John W. Anderson, Gary, Ind.

Application February 1, 1957, Serial No. 637,659

1 Claim. (Cl. 74—230.3)

This invention relates to pulleys and more particularly to a pulley formed of two interconnected complementary half sections.

Briefly, this invention contemplates a pulley wheel formed by the assembly of two identical plate sections. Each half pulley section includes a pair of integral post members and a pair of spaced apertures. The post members on each half section are adapted to interfit with the apertures on the other half section whereupon the exposed ends of the post means may be flattened to rivet the two sections solidly together.

Referring to the drawings.

Figure 1:
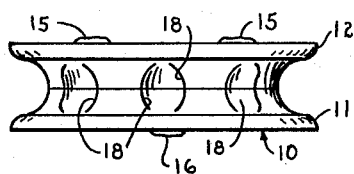
Figure 1 is an assembly view showing the completed pulley structure of this invention.
Figure 2:
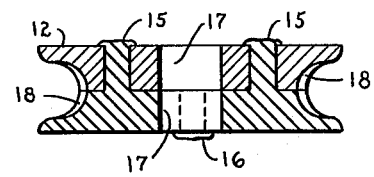
Figure 2 is a sectional view taken along a plane cutting through the center of the pulley shown in Figure 1.
Figure 3:
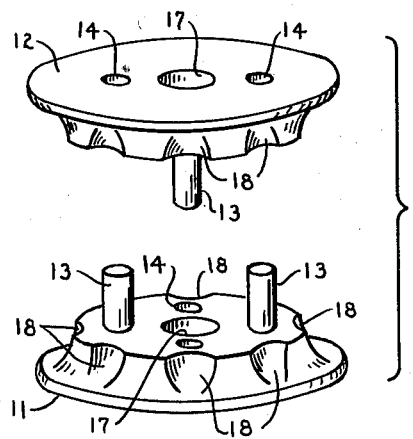
Figure 3 is an exploded perspective view showing the separate half sections that are adapted to be assembled to form the completed pulley of the present invention.

Referring to the drawings wherein like reference numerals refer to like parts throughout the several views, the pulley 10 shown in Figure 1 is a composite structure produced by joining the half sections or elements 11 and 12 together. Each of the half sections or plates 11 and 12 are identical and are adapted to be interfitted to produce the completed pulley structure. Each half section is provided preferably with a pair of integral post members 13 and spaced apertures 14. As is best shown in Figure 3, the posts 13 of one half section are positioned to cooperate with the mating apertures 14 in the other half section whereupon the elements 11 and 12 are thus adapted to be interfitted.

The post members 13 are designed to have a length slightly longer than the thickness of the half section with which they cooperate so that the posts 13 extend not only through apertures 14 but also beyond the outside wall of the other half section. Thus, the post elements on section 11 will extend through and beyond the apertures 14 on section 12 so that their ends can be peened over as at 15 to hold the half section 12 assembled firmly with respect to half section 11. Similarly, the post elements 13 on the half section 12 extend through and beyond the apertures 14 in the half section 11 so that they will be peened over as indicated at 16 to hold the section 11 firmly engaged to section 12.

Each of the sections 11 and 12 are preferably cast with a center aperture 17 which is adapted to engage with a drive shaft (not shown). The position of posts 13 relative to the cooperating apertures 14 in the assembled half sections is such as to insure proper alignment of the apertures 17 in each half section.

Similarly, the posts 13 and apertures 14 are selectively positioned relative to the plurality of notches 18 cast in the periphery of the pulley sections. This is desired so that upon assembly, the respective notch elements 18 will fall into alignment to produce a continuous notched design across the periphery of the completed pulley at spaced points around its surface.

The pulley above described is adapted for use with any well-known type of pulley belt and provides a very solidly constructed, easily manufactured pulley wheel. The number of posts 13 and cooperating apertures 14 may be varied depending on the size of the pulley as well as the load being carried thereby so that a larger number than the pair of posts shown may be formed on each half section and a corresponding number of apertures, as will be obvious.

The pulley shown in the present drawings is adapted for cooperation with a pulley belt having a circular cross section. The notches 18 in the surface provide frictionless gripping means for firmly engaging such a pulley belt. It is obvious, of course, that the peripheral shape of the pulley could be varied to accommodate a V-shaped belt drive or any other conventional shape of pulley belt.

It is suggested that modifications of this invention may occur to those skilled in the art which will fall within the scope of the following claim.

I claim:

A pulley consisting of two identical complementary circular cast bodies joined together, each body being substantially half the thickness of the pulley and having a central shaft opening, the contiguous faces of each body being flat, and means securing the bodies rigidly together with the contiguous flat faces in abutting relation and their peripheries in registry, said means comprising a set of at least two spaced-apart solid posts integrally formed on each of the abutting faces of said bodies and extending through mating correspondingly located openings formed in the other body between the posts thereof, the free ends of said sets of posts extending through the opposite sides of said pulley and being deformed thereagainst, the periphery of each plate being progressively reduced from its outer edge toward said contiguous faces to cooperate with the periphery of the other body to provide a belt channel, there being mating notches formed in the belt channel portion of each body to provide gripping means for firmly engaging a belt.

References Cited in the file of this patent

UNITED STATES PATENTS

| 959,212   | Frick    | May 24, 1910  |
| 1,627,558 | Grunwald | May 10, 1927  |
| 1,632,602 | Hopfield | June 14, 1927 |
| 1,886,431 | Seelbach | Nov. 8, 1932  |
| 2,211,102 | Davis    | Aug. 13, 1940 |
| 2,534,679 | Place    | Dec. 19, 1950 |
| 2,662,415 | Shields  | Dec. 15, 1953 |